United States Patent
Inoue et al.

(10) Patent No.: US 12,525,626 B2
(45) Date of Patent: Jan. 13, 2026

(54) FUEL CELL SYSTEM AND METHOD FOR REDUCING VIBRATION AND NOISE OF FUEL CELL SYSTEM

(71) Applicant: HONDA MOTOR CO., LTD., Tokyo (JP)

(72) Inventors: Kazuhide Inoue, Wako (JP); Kazusa Koga, Wako (JP); Takuto Nakagawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 526 days.

(21) Appl. No.: 18/112,638

(22) Filed: Feb. 22, 2023

(65) Prior Publication Data

US 2023/0290968 A1    Sep. 14, 2023

(30) Foreign Application Priority Data

Mar. 11, 2022    (JP) ................................ 2022-037663

(51) Int. Cl.
| | |
|---|---|
| H01M 8/04111 | (2016.01) |
| H01M 8/0258 | (2016.01) |
| H01M 8/04089 | (2016.01) |
| H01M 8/04119 | (2016.01) |
| H01M 8/04828 | (2016.01) |
| H01M 8/10 | (2016.01) |

(52) U.S. Cl.
CPC ...... *H01M 8/04111* (2013.01); *H01M 8/0258* (2013.01); *H01M 8/04104* (2013.01); *H01M 8/04164* (2013.01); *H01M 8/04843* (2013.01); *H01M 2008/1095* (2013.01)

(58) Field of Classification Search
None
See application file for complete search history.

(56) References Cited

U.S. PATENT DOCUMENTS

| | | | | |
|---|---|---|---|---|
| 11,398,635 | B2* | 7/2022 | Koiwa | H01M 8/04179 |
| 11,695,141 | B2* | 7/2023 | Sakai | H01M 8/04858 |
| | | | | 429/456 |
| 2010/0255394 | A1* | 10/2010 | Wake | H01M 8/04231 |
| | | | | 429/429 |
| 2018/0358638 | A1* | 12/2018 | Mielke | H01M 8/04303 |
| 2019/0198900 | A1* | 6/2019 | Ohashi | H01M 8/0435 |
| 2019/0217846 | A1* | 7/2019 | Fukatsu | H01M 8/04164 |
| 2020/0036018 | A1* | 1/2020 | Yamanaka | H01M 8/04686 |

FOREIGN PATENT DOCUMENTS

JP     2021-018850 A    2/2021

* cited by examiner

*Primary Examiner* — Brian R Ohara
*Assistant Examiner* — M. T. Leonard
(74) *Attorney, Agent, or Firm* — Carrier, Shende & Associates P.C.; Joseph P. Carrier; Fulchand P. Shende

(57) ABSTRACT

A control unit of a fuel cell system opens a second valve at the time of closing a first valve, and maintains the same operating state of a compressor before closing the first valve and after opening the second valve.

3 Claims, 6 Drawing Sheets

FUEL CELL SYSTEM AND METHOD FOR REDUCING VIBRATION AND NOISE OF FUEL CELL SYSTEM

CROSS-REFERENCE TO RELATED APPLICATIONS

This application is based upon and claims the benefit of priority from Japanese Patent Application No. 2022-037663 filed on Mar. 11, 2022, the contents of which are incorporated herein by reference.

BACKGROUND OF THE INVENTION

Field of the Invention

The present invention relates to a fuel cell system with reduced vibration and noise of a compressor and a method for reducing vibration and noise of a fuel cell system.

Description of the Related Art

In recent years, research and development have been conducted on fuel cells that contribute to energy efficiency in order to ensure that more people have access to affordable, reliable, sustainable and modern energy.

JP 2021-018850 A discloses a fuel cell system mounted on a fuel cell vehicle. Hereinafter, this fuel cell system is also referred to as a first system. In the first system, the anode gas is supplied from the anode supply flow path to the anode flow field inside the fuel cell stack. The main component of the anode gas is hydrogen. In the first system, the cathode gas is supplied from the cathode supply flow path to the cathode flow field inside the fuel cell stack. The cathode gas is air (oxygen, nitrogen, etc.). The fuel cell stack generates electricity by reactions between hydrogen in the anode gas and oxygen in the cathode gas. An anode off-gas (hydrogen, nitrogen, moisture, etc.) is discharged from the anode flow field. The anode off-gas is supplied to a gas-liquid separator. The gas-liquid separator separates the anode off-gas into a gas component (hydrogen, nitrogen, etc.) and a liquid component (water).

The anode off-gas separated by the gas-liquid separator may be supplied to the anode supply flow path via a circulation flow path. Alternatively, the anode off-gas separated by the gas-liquid separator may be discharged together with water to the outside of the fuel cell system via a drain channel and a diluter.

Currently, new fuel cell systems are being developed. Hereinafter, the currently developed fuel cell system is also referred to as a second system. In the second system, the inside of the fuel cell stack is maintained at high humidity. Therefore, a large amount of water is generated inside the fuel cell stack. In the second system, separately from the drain channel (first drain channel) connected to the gas-liquid separator, a drain channel (second channel) directly connected to the anode flow field is provided. The water accumulated inside the fuel cell stack may be discharged together with the anode off-gas to the outside of the fuel cell system via the second drain channel and the diluter.

SUMMARY OF THE INVENTION

The diluter dilutes hydrogen with air when the water and the anode off-gas is discharged to the outside. Therefore, when the water and the anode off-gas is started to be discharged, the controller of the fuel cell system increases the rotation speed of the compressor to increase the air supply. When the water and the anode off-gas are stopped to be discharged, the controller decreases the rotation speed of the compressor to decrease the air supply.

In the case where a plurality of drain channels are provided as in the second system, the total number of times of discharge of the water and the anode off-gas increases. As such, the controller frequently changes the rotation speed of the compressor. At the time when the rotation speed of the compressor increases, vibration and noise change. That is, the second system has a problem that the vibration change and the noise change of the compressor increase as compared with the first system. The increase in the vibration change and the noise change of the compressor may cause discomfort to the user.

An object of the present invention is to solve the aforementioned problem.

A first aspect of the present invention is to provide a fuel cell system comprising: a fuel cell stack configured to generate electric power using an anode gas in an anode flow field and a cathode gas in a cathode flow field; a gas-liquid separator configured to separate an exhaust fluid discharged from the anode flow field into gas and water; a first exhaust passage configured to discharge the water and the gas from the gas-liquid separator to an outside; a second exhaust passage configured to discharge the exhaust fluid from the anode flow field to the outside; a first valve configured to open and close the first exhaust passage; a second valve configured to open and close the second exhaust passage; a compressor configured to supply air for dilution of the exhaust fluid and the gas to be discharged to the outside; and a controller configured to control opening and closing of the first valve and the second valve, wherein the controller opens the second valve at a time of closing the first valve, and maintains a same operation state of the compressor before closing the first valve and after opening the second valve.

A second aspect of the present invention is to provide a method for reducing vibration and noise of a fuel cell system, the fuel cell system comprising: a fuel cell stack configured to generate electric power using an anode gas in an anode flow field and a cathode gas in a cathode flow field; a gas-liquid separator configured to separate an exhaust fluid discharged from the anode flow field into gas and water; a first exhaust passage configured to discharge the water and the gas from the gas-liquid separator to an outside; a second exhaust passage configured to discharge the exhaust fluid from the anode flow field to the outside; a first valve configured to open and close the first exhaust passage; a second valve configured to open and close the second exhaust passage; a compressor configured to supply air for dilution of the exhaust fluid and the gas to be discharged to the outside; and a computer configured to control opening and closing of the first valve and the second valve, comprising causing the computer to: open the second valve at a time of closing the first valve, and maintain a same operation state of the compressor before closing the first valve and after opening the second valve.

According to the present invention, it is possible to reduce the number of times the vibration of the compressor greatly changes and the number of times the noise greatly changes.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE INVENTION

1. Configuration of Fuel Cell System 10

Figure 1:
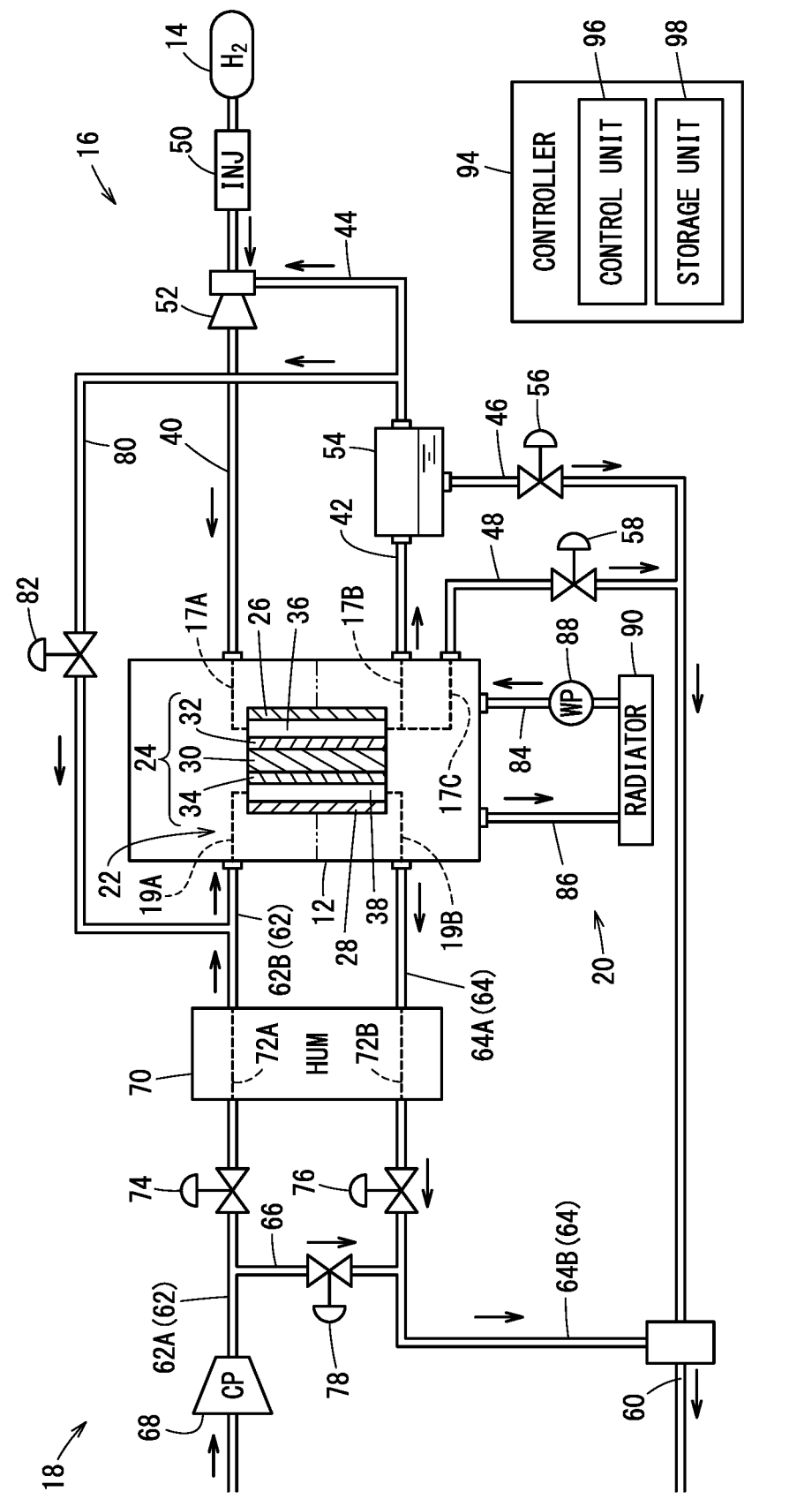
FIG. 1 is a schematic diagram of a fuel cell system according to an embodiment.

FIG. 1 is a schematic diagram illustrating a fuel cell system 10 according to the present invention. The fuel cell system 10 may be mounted on a vehicle (fuel cell automobile). Apart from a vehicle, the fuel cell system 10 can be mounted, for example, on a ship, an aircraft, a robot, or the like. The fuel cell system 10 includes a fuel cell stack 12, a hydrogen tank 14, an anode system 16, a cathode system 18, and a cooling system 20. The fuel cell system 10 includes a controller 94. The output (electric power) of the fuel cell stack 12 is supplied to a load (not shown) such as a motor.

The fuel cell stack 12 has a plurality of power generation cells 22 stacked one another. Each of the power generation cells 22 includes a membrane electrode assembly 24 (simply referred to also as electrode assembly 24), and a pair of separators 26, 28. The pair of separators 26, 28 sandwich the electrode assembly 24.

The electrode assembly 24 includes a solid polymer electrolyte membrane 30 (simply referred to also as electrolyte membrane 30), an anode 32, and a cathode 34. The electrolyte membrane 30 is formed by impregnating a thin membrane of perfluorosulfonic acid with water, for example. The anode 32 and the cathode 34 sandwich the electrolyte membrane 30 therebetween. Each of the anode 32 and the cathode 34 has a gas diffusion layer made from carbon paper or the like. An electrode catalyst layer of a platinum alloy supported on porous carbon particles is coated uniformly on the surface of the gas diffusion layer. The electrode catalyst layer is formed on both surfaces of the electrolyte membrane 30, respectively.

An anode flow field 36 is formed on a surface of the separator 26 facing the electrode assembly 24. The anode flow field 36 is connected to an anode supply flow path 40 via an anode inlet 17A. The anode flow field 36 is connected to an anode discharge flow path 42 via a first anode outlet 17B. The anode flow field 36 is connected to a second drain flow path 48 via the second anode outlet 17C. The second anode outlet 17C is located lower than the first anode outlet 17B. A cathode flow field 38 is formed on a surface of the separator 28 facing the electrode assembly 24. The cathode flow field 38 is connected to a cathode supply flow path 62 via a cathode inlet 19A. The cathode flow field 38 is connected to a cathode discharge flow path 64 via a cathode outlet 19B.

An anode gas (hydrogen) is supplied to the anode 32. At the anode 32, hydrogen ions and electrons are generated from hydrogen molecules by electrode reactions caused by catalyst. The hydrogen ions permeate the electrolyte membrane 30 and move to the cathode 34. The electrons move through a negative electrode terminal (not shown) of the fuel cell stack 12, a load such as a motor, a positive electrode terminal (not shown) of the fuel cell stack 12, and the cathode 34 in the order. At the cathode 34, by action of the catalyst, hydrogen ions and electrons, and oxygen contained in the supplied air are reacted to produce water.

The anode system 16 includes components for supplying the anode gas to the anode 32 and components for discharging the anode off-gas from the anode 32. The anode system 16 includes the anode supply flow path 40, the anode discharge flow path 42, a circulation flow path 44, a first drain flow path 46 (first exhaust passage), and the second drain flow path 48 (second exhaust passage). The anode system 16 also includes an injector 50, an ejector 52, a gas-liquid separator 54, a first drain valve 56 (first valve), and a second drain valve 58 (second valve).

The anode supply flow path 40 connects an outlet of the hydrogen tank 14 to the anode inlet 17A. The anode supply flow path 40 is provided with the injector 50 and the ejector 52. The ejector 52 is arranged closer to the anode inlet 17A than the injector 50.

The anode discharge flow path 42 connects the first anode outlet 17B to the inlet of the gas-liquid separator 54. The circulation flow path 44 connects a gas outlet of the gas-liquid separator 54 to the ejector 52. The first drain flow path 46 connects a water outlet of the gas-liquid separator 54 to an inlet of a diluter 60. The first drain flow path 46 is provide with a first drain valve 56. The second drain flow path 48 connects the second anode outlet 17C to the first drain flow path 46 at a portion downstream of the first drain valve 56. The second drain flow path 48 is provide with the second drain valve 58.

The cathode system 18 includes components for supplying the cathode gas to the cathode 34 and components for discharging the cathode off-gas from the cathode 34. The cathode system 18 includes the cathode supply flow path 62, the cathode discharge flow path 64, and a bypass flow path 66. The cathode system 18 also includes a compressor 68, a humidifier 70, a first stop valve 74, a second stop valve 76, and a bypass valve 78.

The cathode supply flow path 62 connects an air intake port (not shown) to the cathode inlet 19A. The cathode supply flow path 62 is provided with the compressor 68, the first stop valve 74, and a flow path 72A of the humidifier 70. A portion of the cathode supply flow path 62 upstream of the humidifier 70 is referred to as a cathode supply flow path 62A. A portion of the cathode supply flow path 62 downstream of the humidifier 70 is referred to as a cathode supply flow path 62B. The cathode supply flow path 62A is provided with the compressor 68 and the first stop valve 74. The first stop valve 74 is disposed closer to the humidifier 70 than the compressor 68.

The cathode discharge flow path 64 connects the cathode outlet 19B to the inlet of the diluter 60. The cathode discharge flow path 64 is provided with a flow path 72B of the humidifier 70 and the second stop valve 76. A portion of the cathode discharge flow path 64 upstream of the humidifier 70 is referred to as a cathode discharge flow path 64A. A portion of the cathode supply flow path 62 downstream of the humidifier 70 is referred to as a cathode discharge flow path 64B. The cathode discharge flow path 64B is provided with the second stop valve 76.

The bypass flow path 66 connects the cathode supply flow path 62A to the cathode discharge flow path 64B. For example, the bypass flow path 66 connects a portion of the cathode supply flow path 62A between the compressor 68 and the first stop valve 74 to a portion of the cathode discharge flow path 64B downstream of the second stop valve 76. The bypass flow path 66 is provided with the bypass valve 78.

The anode system 16 and the cathode system 18 are connected by a connection flow path 80. The connection flow path 80 connects the circulation flow path 44 of the anode system 16 to the cathode supply flow path 62B of the cathode system 18. The connection flow path 80 is provided with a bleed valve 82.

The cooling system 20 includes components for supplying a coolant to the fuel cell stack 12, and components for discharging the coolant from the fuel cell stack 12. The cooling system 20 includes a coolant supply flow path 84 and a coolant discharge flow path 86. The cooling system 20 also includes a coolant pump 88 and a radiator 90.

A coolant flow field (not shown) for cooling the fuel cell stack 12 is formed inside the fuel cell stack 12. The coolant supply flow path 84 connects an outlet of the radiator 90 to an inlet of the coolant flow field. The coolant supply flow path 84 is provided with the coolant pump 88. The coolant discharge flow path 86 connects an outlet of the coolant flow path to an inlet of the radiator 90.

The controller 94 is a computer (for example, an ECU of the vehicle). The controller 94 includes a control unit 96 and a storage unit 98. The control unit 96 includes a processing circuit. The processing circuit may be a processor such as a CPU or the like. The processing circuit may be an integrated circuit such as an ASIC, an FPGA, or the like. The processor is capable of executing various processes by executing programs stored in the storage unit 98. At least a portion from among a plurality of processes may be performed by an electronic circuit including a discrete device.

The control unit 96 controls the operation of the fuel cell system 10. For example, the control unit 96 receives detection signals from various sensors provided in the fuel cell system 10. Based on the detection signals, the control unit 96 outputs control signals for controlling the valves, the injector 50, the compressor 68, the coolant pump 88, and the like. The valves, the injector 50, the compressor 68, the coolant pump 88, and the like operate in response to the control signals.

The storage unit 98 includes a volatile memory and a non-volatile memory. Examples of the volatile memory include a RAM (Random Access Memory) or the like. The volatile memory is used as a working memory of the processor. In the volatile memory, data and the like required for carrying out processing or computations are temporarily stored therein. Examples of the non-volatile memory include a ROM (Read Only Memory), a flash memory, and the like. Such a non-volatile memory is used as a storage memory. Programs, tables, and maps, and the like are stored in the non-volatile memory. At least part of the storage unit 98 may be provided in the processor, the integrated circuit, etc. as described above.

2. Flow of Fluid

2-1 Fluid Flow in Anode System 16

The injector 50 injects the anode gas (hydrogen) in the hydrogen tank 14 toward the downstream side of the anode supply flow path 40. The anode gas injected from the injector 50 flows through the anode supply flow path 40 and is supplied to the anode flow field 36. The anode gas flows through the anode flow field 36 and is discharged from the first anode outlet 17B as an anode off-gas. The anode off-gas contains hydrogen that has not reacted with oxygen, nitrogen that had been contained in the cathode gas and has permeated the electrolyte membrane 30, and water produced by reactions between oxygen and hydrogen.

The anode off-gas flows through the anode discharge flow path 42 and is supplied to the gas-liquid separator 54. The gas-liquid separator 54 separates the anode off-gas into a gas component (anode off-gas) and a liquid component (water). The anode off-gas discharged from the gas-liquid separator 54 flows through the circulation flow path 44 and is supplied to the ejector 52. In the ejector 52, the anode off-gas and the anode gas injected from the injector 50 join together.

The water separated at the gas-liquid separator 54 is temporarily stored at the bottom of the gas-liquid separator 54. In a state where the first drain valve 56 is opened, the water stored in the gas-liquid separator 54 flows through the first drain flow path 46 and is discharged to the diluter 60. When the first drain valve 56 is opened in a state in which there is no water in the gas-liquid separator 54, the anode off-gas in the gas-liquid separator 54 flows through the first drain flow path 46 and is discharged to the diluter 60.

When the humidity inside the fuel cell stack 12 is high, water is stored at the bottom of the anode flow field 36. When the second drain valve 58 is opened, the water having been stored in the anode flow field 36 flows into the second drain flow path 48 and the first drain flow path 46 and is discharged to the diluter 60. When the second drain valve 58 is opened in a state in which there is no water in the anode flow field 36, the anode off-gas in the anode flow field 36 flows through the second drain flow path 48 and the first drain flow path 46 and is discharged to the diluter 60.

2-2 Fluid Flow in Cathode System 18

The compressor 68 discharges the cathode gas (air) sucked from the outside of the vehicle toward the downstream side of the cathode supply flow path 62. In a state where the first stop valve 74 is opened, the cathode gas discharged from the compressor 68 flows through the cathode supply flow path 62 and is supplied to the cathode flow field 38. The cathode gas flows through the cathode flow field 38 and is discharged from the cathode outlet 19B as a cathode off-gas. The cathode off-gas contains components contained in the air and water generated by the reactions between oxygen and hydrogen.

In a state where the second stop valve 76 is opened, the cathode off-gas flows through the cathode discharge flow path 64 and is discharged to the diluter 60. The cathode off-gas contains water. In the humidifier 70, the water contained in the cathode off-gas is used to humidify the cathode gas.

When the bypass valve 78 is opened, the cathode gas flows through the bypass flow path 66 and the cathode discharge flow path 64 and is discharged to the diluter 60. The bypass flow path 66 is used when the amount of cathode gas supplied to the fuel cell stack 12 is decreased.

2-3 Fluid Flow in Connection Flow Path 80

In the state where the bleed valve 82 is opened, a portion of the anode off-gas flowing through the circulation flow path 44 flows through the connection flow path 80 and is supplied to the cathode supply flow path 62B. However, the bleed valve 82 is opened only when the pressure in the anode flow field 36 is higher than the pressure in the cathode flow field 38.

The hydrogen in the anode off-gas having flowed through the connection flow path 80 is supplied to the cathode supply flow path 62B and consumed in reactions with oxygen on the catalyst of the cathode 34. Therefore, the amount of hydrogen discharged from the anode system 16 to the outside decreases, and accordingly, the amount of air required for diluting the hydrogen in the diluter 60 also decreases. With the connection flow path 80, the rotation speed of the compressor 68 that supplies air to the diluter 60 can be reduced, and the fuel efficiency is improved. Thus, the fuel cell system 10 contributes to energy efficiency.

3. Relationship Between Valve Diameter and Rotation Speed of Compressor 68

As an exhaust passage from the anode flow field 36 to the diluter 60, there is provided a first channel (the first drain flow path 46) including the first drain valve 56. As an exhaust passage from the anode flow field 36 to the diluter 60, there is provided a second channel (the second drain flow path 48 and the first drain flow path 46) including the second drain valve 58. As an exhaust passage from the anode flow field 36 to the diluter 60, there is provided a third channel (the connection flow path 80, the cathode supply flow path 62B, the cathode flow field 38, the cathode discharge flow path 64) including the bleed valve 82.

The diameter of the flow path inside the first drain valve 56 and the diameter of the flow path inside the second drain valve 58 are substantially equal to each other. Therefore, the amount of air required for diluting hydrogen when the exhaust passage is the first channel is substantially the same as the amount of air required for diluting hydrogen when the exhaust passage is the second channel. That is, the rotation speed of the compressor 68 when the exhaust passage is the first channel and the rotation speed of the compressor 68 when the exhaust passage is the second channel may be substantially the same. Therefore, when the target of valve opening is switched from the first drain valve 56 to the second drain valve 58, the rotation speed of the compressor 68 may be substantially constant.

On the other hand, the diameter of the flow path inside the bleed valve 82 is smaller than the diameter of the flow path inside the first drain valve 56 and the diameter of the flow path inside the second drain valve 58. Further, a part of hydrogen in the anode off-gas flowing through the third channel is consumed by the fuel cell stack 12. Therefore, the amount of air required for diluting hydrogen when the exhaust passage is the third channel may be smaller than the amount of air required for diluting hydrogen when the exhaust passage is the first channel or the second channel.

4. Each Process Executed by Control Unit 96

During power generation by the fuel cell stack 12, the control unit 96 performs the first drain valve control process (FIG. 2), the second drain valve control process (FIG. 3), and the compressor control process (FIG. 4) in parallel.

4-1 First Drain Valve Control Process

Figure 2:
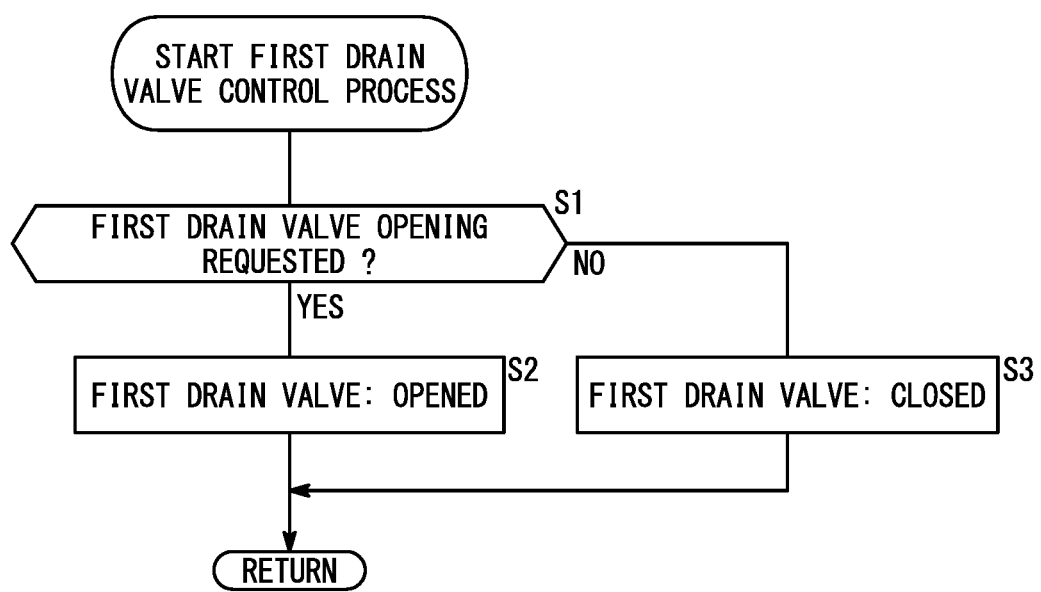
FIG. 2 is a flowchart illustrating first drain valve control process.

FIG. 2 is a flowchart illustrating the first drain valve control process. During power generation by the fuel cell stack 12, the control unit 96 repeatedly performs the first drain valve control process shown in FIG. 2.

In step S1, the control unit 96 determines whether or not there is a request to open the first drain valve 56. For example, the control unit 96 periodically repeats opening and closing of the first drain valve 56. In this case, the control unit 96 can monitor the system time and determine the valve opening period and the valve closing period of the first drain valve 56. Alternatively, the control unit 96 may estimate the amount of water in the gas-liquid separator 54 based on the power generation amount, and determine the valve opening period and the valve closing period based on whether or not the estimated amount exceeds a predetermined amount. During the period in which the first drain valve 56 is supposed to be opened, the control unit 96 determines whether valve opening is requested. Further, during the period in which the first drain valve 56 is supposed to be closed the control unit 96 determines whether valve opening is not requested. The valve opening request is maintained for the valve opening period. If there is a valve opening request (step S1: YES), the process proceeds to step S2. On the other hand, if there is no valve opening request (step S1: NO), the process proceeds to step S3.

When the process proceeds from step S1 to step S2, the control unit 96 opens the first drain valve 56. If the first drain valve 56 is already opened, the control unit 96 keeps the first drain valve 56 opened. On the other hand, if the first drain valve 56 is closed, the control unit 96 opens the first drain valve 56. The water and a part of the anode off-gas in the gas-liquid separator 54 flow through the first drain flow path 46 and are discharged to the diluter 60.

When the process proceeds from step S1 to step S3, the control unit 96 brings the first drain valve 56 into the closed state. If the first drain valve 56 is already closed, the control unit 96 keeps the first drain valve 56 closed. On the other hand, if the first drain valve 56 is opened, the control unit 96 closes the first drain valve 56.

4-2 Second Drain Valve Control Process

Figure 3:
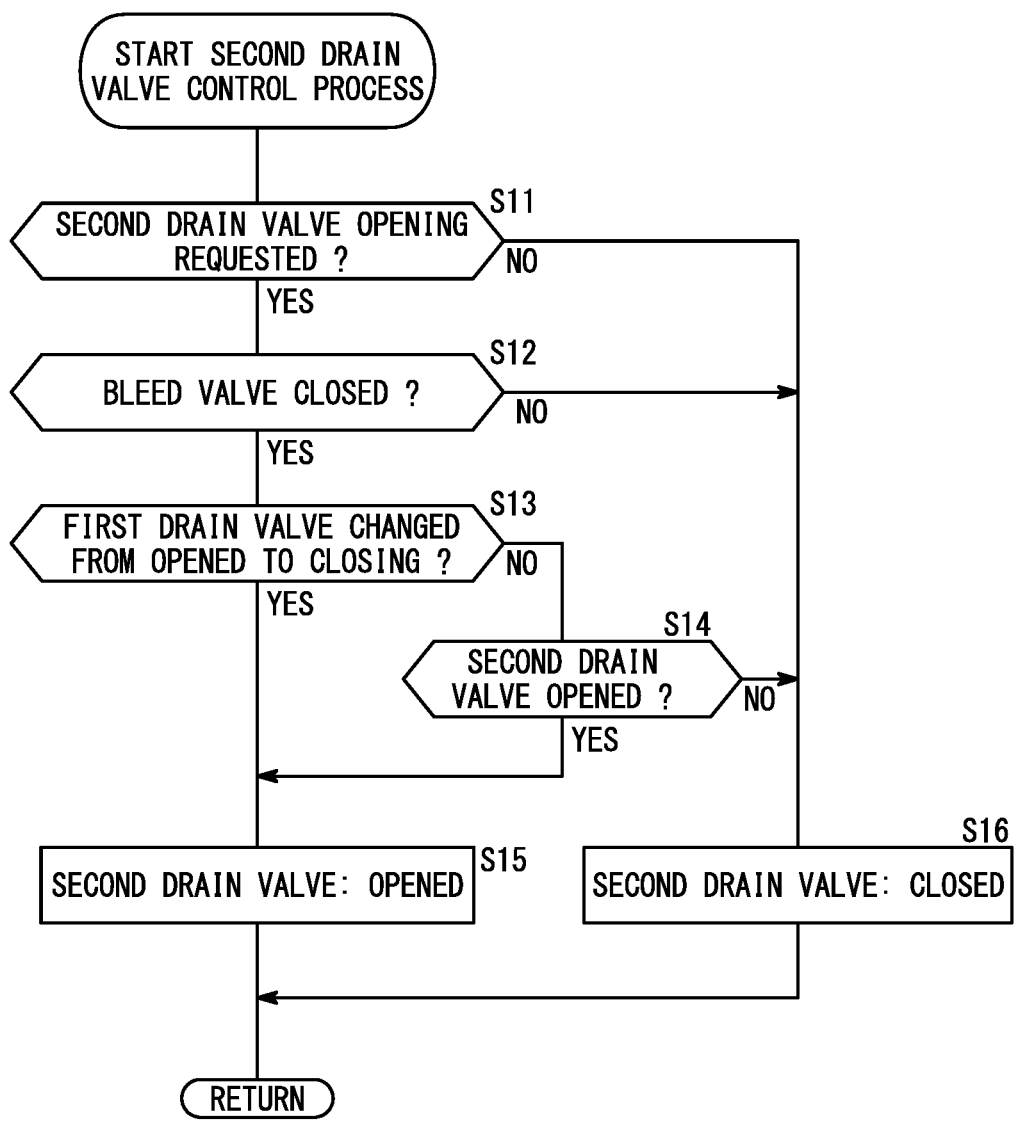
FIG. 3 is a flowchart illustrating second drain valve control process.

FIG. 3 is a flowchart illustrating second drain valve control process. During power generation by the fuel cell stack 12, the control unit 96 repeatedly performs the second drain valve control process shown in FIG. 3.

In step S11, the control unit 96 determines whether or not there is a request to open the second drain valve 58. For example, in a case where water is produced in a large amount, the control unit 96 opens the second drain valve 58 for a certain period of time. The amount of water produced and the amount of power generated by the fuel cell stack 12 correlate with each other. The control unit 96 integrates time during which the target amount of power to be generated exceeds the predetermined threshold of the power generation amount. The control unit 96 determines that valve opening is requested in the case where the integrated time value exceeds a predetermined time threshold value. Further, in a case where the certain period of time has elapsed after the second drain valve 58 is opened, the control unit 96 determines that valve opening is not requested. The valve opening request is maintained for a certain period of time. If there is a valve opening request (step S11: YES), the process proceeds to step S12. On the other hand, if there is no valve opening request (step S11: NO), the process proceeds to step S16.

When the process proceeds from step S11 to step S12, the control unit 96 determines whether or not the bleed valve 82 is currently in the closed state. In the case where the bleed valve 82 is in the closed state (step S12: YES), the process proceeds to step S13. On the other hand, in the case where the bleed valve 82 is not in the closed state, that is, the bleed valve 82 is in the open state (step S12: NO), the process proceeds to step S16.

When the process proceeds from step S12 to step S13, the control unit 96 determines whether or not the first drain valve 56 have been switched from the open state to the closed state in the most recent first drain-valve control process. In other words, the control unit 96 determines whether or not the first drain valve 56 has just changed from the open state to the closed state. In the case where the first drain valve 56 has changed from the open state to the closed state (step S13: YES), the process proceeds to step S15. At this time point, the control unit 96 recognizes the valve closing timing of the first drain valve 56. On the other hand, in the case where the first drain valve 56 have not changed from the open state to the closed state (step S13: NO), the process proceeds to step S14.

When the process proceeds from step S13 to step S14, the control unit 96 determines whether or not the second drain valve 58 is currently opened. The process of step S14 is performed to prevent the second drain valve 58 from changing from the open state to the closed state while opening of the second drain valve 58 is requested. In the case where the second drain valve 58 is in the open state (step S14: YES), the process proceeds to step S15. On the other hand, in the case where the second drain valve 58 is not in the open state, that is, in the case where the second drain valve 58 is in the closed state (step S14: NO), the process proceeds to step S16.

When the process proceeds from Step S13 or Step S14 to Step S15, the control unit 96 opens the second drain valve 58. When the second drain valve 58 is already opened, the control unit 96 maintains the open state of the second drain valve 58. On the other hand, if the second drain valve 58 is closed, the control unit 96 opens the second drain valve 58. The water and a part of the anode off-gas in the anode flow field 36 flow through the second drain flow path 48 and the first drain flow path 46 and are discharged to the diluter 60.

When the process proceeds from step S11, step S12, or step S14 to step S16, the control unit 96 closes the second drain valve 58. If the second drain valve 58 is already closed, the control unit 96 keeps the second drain valve 58 closed. On the other hand, if the second drain valve 58 is opened, the control unit 96 closes the second drain valve 58.

4-3 Compressor Control Process

Figure 4:
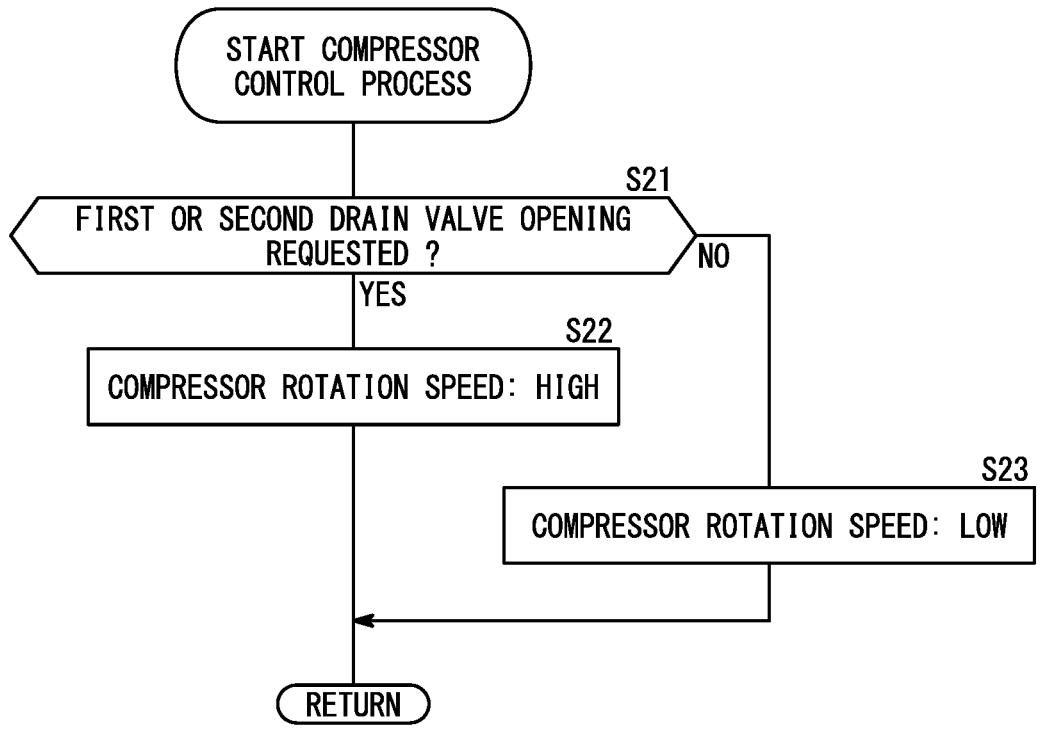
FIG. 4 is a flowchart illustrating compressor control process.

FIG. 4 is a flowchart illustrating compressor control process. The control unit 96 repeatedly performs the compressor control process shown in FIG. 4 during the operation of the fuel cell system 10.

In step S21, the control unit 96 determines whether or not there is a request to open the first drain valve 56 or the second drain valve 58. If opening of at least one of the valves is requested (step S21: YES), the process proceeds to step S22. On the other hand, if opening of neither of the valves is requested (step S21: NO), the process proceeds to step S23.

When the process proceeds from step S21 to step S22, the control unit 96 switches the rotation speed of the compressor 68 from a low speed state (including a stopped state) to a high speed state. When the rotation speed of the compressor 68 is already in the high speed state, the control unit 96 maintains the rotation speed of the compressor 68. On the other hand, when the rotation speed of the compressor 68 is in the low speed state, the control unit 96 increases the rotation speed of the compressor 68. Thus, the amount of the air discharged from the compressor 68 to the cathode supply flow path 62A increases. Therefore, the amount of air supplied to the diluter 60 increases. The control unit 96 opens the bypass valve 78 as necessary to prevent the inside of the fuel cell stack 12 from being dried due to the increase in the amount of air.

When the process proceeds from step S21 to step S23, the control unit 96 switches the rotation speed of the compressor 68 from the high speed state to the low speed state (including the stopped state). When the rotation speed of the compressor 68 is already in the low speed state, the control unit 96 maintains the rotation speed of the compressor 68. On the other hand, when the rotation speed of the compressor 68 is in the high speed state, the control unit 96 decreases the rotation speed of the compressor 68.

Figure 5:
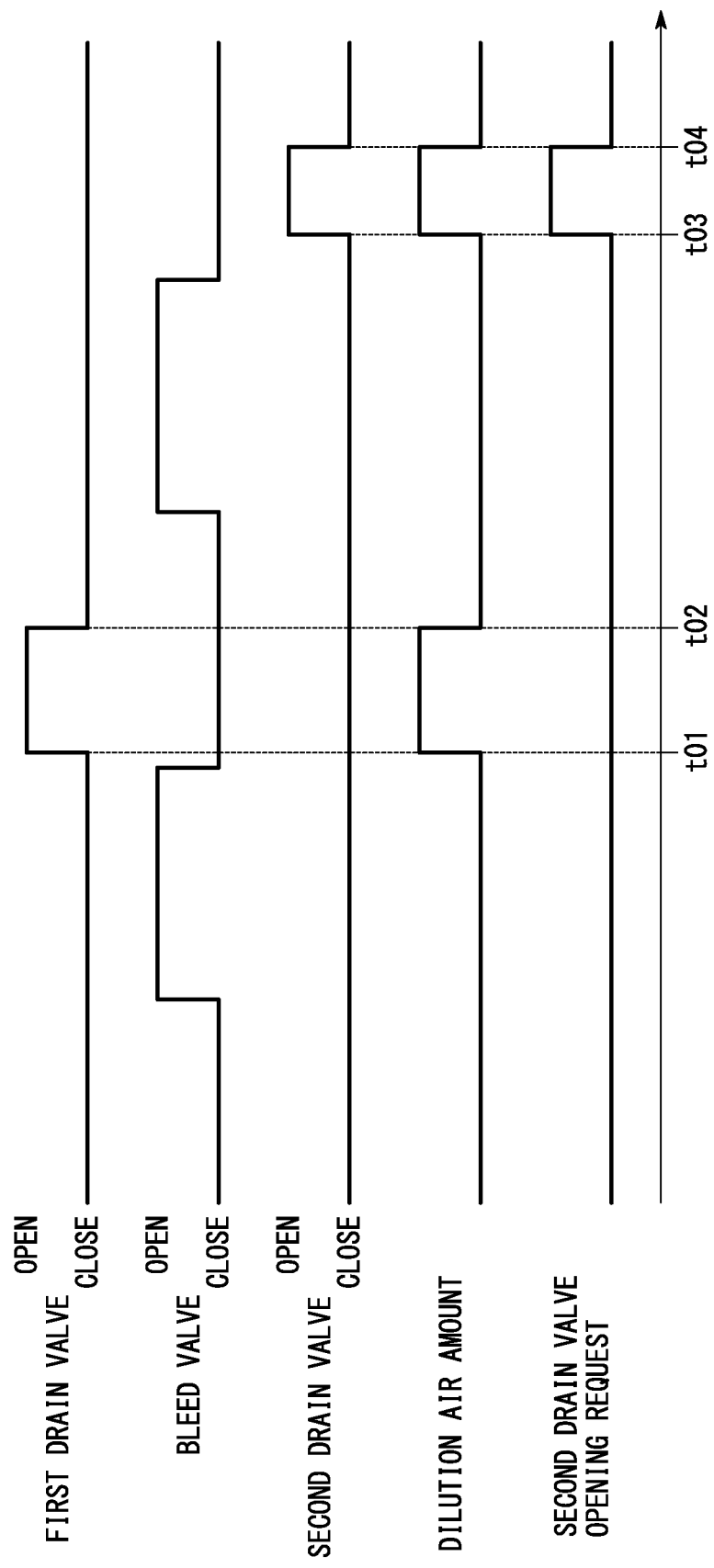
FIG. 5 is a time chart illustrating open/close state of each valve, amount of dilution air discharged from the compressor, and presence or absence of request to open the second drain valve, according to the conventional art.
Figure 6:
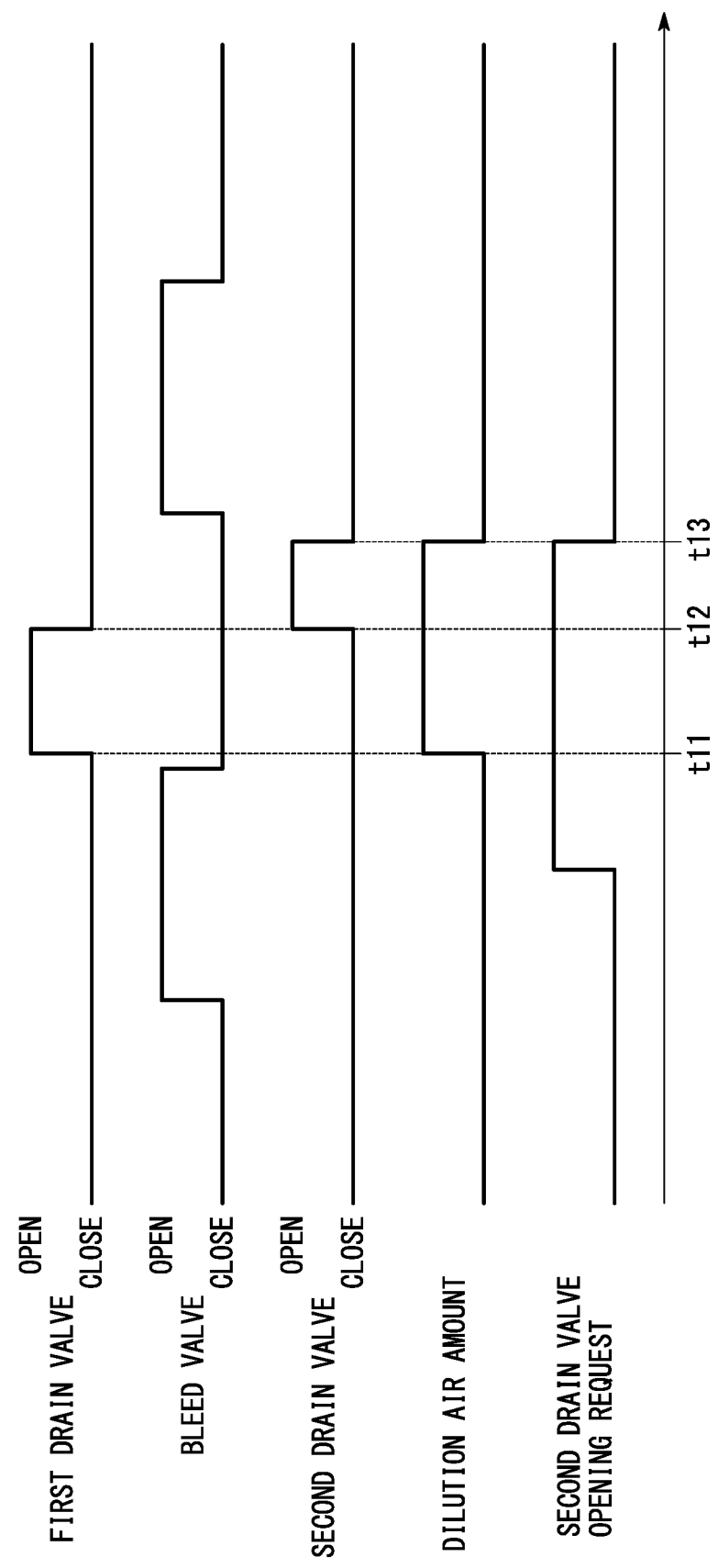
FIG. 6 is a time chart illustrating open/close state of each valve, amount of dilution air discharged from the compressor, and presence or absence of request to open the second drain valve, according to the present embodiment.

5. Temporal Changes in Opened/Closed State of Each Valve and Dilution Air Amount FIG. 5 is a time chart illustrating the open/close state of each valve, the amount of dilution air discharged from the compressor 68, and the presence or absence of request to open the second drain valve 58, according to the conventional art. FIG. 6 is a time chart illustrating the open/close state of each valve, the amount of dilution air discharged from the compressor 68, and the presence or absence of request to open the second drain valve 58, according to the present embodiment.

As shown in FIG. 5, in the conventional art, there is an interval between the valve opening period (t01 to t02) of the first drain valve 56 and the valve opening period (t03 to t04) of the second drain valve 58. The diluter 60 requires a large amount of air at each of the timing (t01) of opening the first drain valve 56 and the timing (t03) of opening the second drain valve 58. Therefore, the control unit 96 switches the rotation speed of the compressor 68 from a low speed to a high speed at each of the timing (t01) of opening the first drain valve 56 and the timing (t03) of opening the second drain valve 58. Further, the control unit 96 switches the rotation speed of the compressor 68 from high to low at each of the timing (t02) of closing the first drain valve 56 and the timing (t04) of closing the second drain valve 58.

As shown in FIG. 6, in the present embodiment, the valve opening period (t11 to t12) of the first drain valve 56 and the valve opening period (t12 to t13) of the second drain valve 58 are continuous. Therefore, the control unit 96 switches the rotation speed of the compressor 68 from low to high at the timing (t11) of opening the first drain valve 56. Further, the control unit 96 switches the rotation speed of the compressor 68 from high to low at the timing (t13) of closing the second drain valve 58. On the other hand, the control unit 96 maintains the rotation speed of the compressor 68 at the timing (t12) of closing the first drain valve 56 and the timing (t12) of opening the second drain valve 58. That is, at the timing (t12) of closing the first drain valve 56 and at the timing (t12) of opening the second drain valve 58, vibration and noise of the compressor 68 do not change.

As shown in FIG. 6, the control unit 96 does not open two or more of the first drain valve 56, the second drain valve 58, and the bleed valve 82 at the same time. If two or more valves are opened, a larger amount of air is needed for hydrogen dilution. In this case, the compressor 68 needs to rotate at a higher speed. As a result, vibration, noise and power consumption of the compressor 68 increase. Therefore, the user may feel uncomfortable. Further, the fuel consumption is deteriorated. Therefore, when one valve is opened, the control unit 96 does not open the other valves.

6. Invention Obtained From Embodiment

The invention understood from the above embodiment will be described below.

A first aspect of the present invention is to provide the fuel cell system (10) comprising: the fuel cell stack (12) configured to generate electric power using the anode gas in the anode flow field (36) and the cathode gas in the cathode flow field (38); the gas-liquid separator (54) configured to separate the exhaust fluid discharged from the anode flow field into gas and water; the first exhaust passage (46) configured to discharge the water and the gas from the gas-liquid separator to the outside; the second exhaust passage (48) configured to discharge the exhaust fluid from the anode flow field to the outside; the first valve (56) configured to open and close the first exhaust passage; the second valve (58) configured to open and close the second exhaust passage; the compressor (68) configured to supply air for dilution of the exhaust fluid and the gas to be discharged to the outside; and the control unit (96) configured to control opening and closing of the first valve and the second valve. The controller opens the second valve at a time of closing the first valve, and maintains the same operation state of the compressor before closing the first valve and after opening the second valve.

In the first aspect, the second valve opens at the time when the first valve closes, and the compressor continues to operate during that time. Therefore, in the first aspect, it is not necessary to greatly reduce the rotation speed of the compressor at the timing of closing the first valve. Further, in the first aspect, it is not necessary to greatly increase the rotation speed of the compressor at the timing of opening the second valve. According to the first aspect, it is possible to reduce the number of times the vibration of the compressor greatly changes and the number of times the noise greatly changes.

In the above aspect, a diameter of a flow path inside the first valve and a diameter of a flow path inside the second valve may be the same as each other.

With the above arrangement, when the target of valve opening is switched from the first valve to the second valve, the rotation speed of the compressor may be substantially constant. Therefore, when the target of valve opening is switched from the first valve to the second valve, the vibration and noise of the compressor do not change.

A second aspect of the present invention is to provide the method for reducing vibration and noise of the fuel cell system, the fuel cell system comprising: the fuel cell stack configured to generate electric power using an anode gas in the anode flow field and the cathode gas in the cathode flow field; the gas-liquid separator configured to separate the exhaust fluid discharged from the anode flow field into gas and water; the first exhaust passage configured to discharge the water and the gas from the gas-liquid separator to the outside; the second exhaust passage configured to discharge the exhaust fluid from the anode flow field to the outside; the first valve configured to open and close the first exhaust passage; the second valve configured to open and close the second exhaust passage; the compressor configured to supply air for dilution of the exhaust fluid and the gas to be discharged to the outside; and the computer (94) configured to control opening and closing of the first valve and the second valve, comprising causing the computer to: open the second valve at a time of closing the first valve, and maintain the same operation state of the compressor before closing the first valve and after opening the second valve.

The present invention is not limited to the above disclosure, and various modifications are possible without departing from the essence and gist of the present invention.

The invention claimed is:

1. A fuel cell system comprising:
    a fuel cell stack configured to generate electric power using an anode gas in an anode flow field and a cathode gas in a cathode flow field;
    a gas-liquid separator configured to separate an exhaust fluid discharged from the anode flow field into gas and water;
    a first exhaust passage configured to discharge the water and the gas from the gas-liquid separator to an outside;
    a second exhaust passage configured to discharge the exhaust fluid from the anode flow field to the outside;
    a first valve configured to open and close the first exhaust passage;
    a second valve configured to open and close the second exhaust passage;
    a compressor configured to supply air for dilution of the exhaust fluid and the gas to be discharged to the outside; and
    a control unit configured to control opening and closing of the first valve and the second valve, wherein
    the controller opens the second valve at a time of closing the first valve, and maintains a same operation state of the compressor before closing the first valve and after opening the second valve.

2. The fuel cell system according to claim 1, wherein a diameter of a flow path inside the first valve and a diameter of a flow path inside the second valve is same as each other.

3. A method for reducing vibration and noise of a fuel cell system, the fuel cell system comprising:
    a fuel cell stack configured to generate electric power using an anode gas in an anode flow field and a cathode gas in a cathode flow field;
    a gas-liquid separator configured to separate an exhaust fluid discharged from the anode flow field into gas and water;
    a first exhaust passage configured to discharge the water and the gas from the gas-liquid separator to an outside;
    a second exhaust passage configured to discharge the exhaust fluid from the anode flow field to the outside;
    a first valve configured to open and close the first exhaust passage;
    a second valve configured to open and close the second exhaust passage;
    a compressor configured to supply air for dilution of the exhaust fluid and the gas to be discharged to the outside; and
    a computer configured to control opening and closing of the first valve and the second valve, comprising:
    causing the computer to:
    open the second valve at a time of closing the first valve, and
    maintain a same operation state of the compressor before closing the first valve and after opening the second valve.

* * * * *